United States Patent [19]

Short

[11] 4,136,593
[45] Jan. 30, 1979

[54] FRONT OPERATED RAKE ADJUSTMENT ASSEMBLY

[75] Inventor: Wilbur G. Short, Browns, Ill.

[73] Assignee: Canron, Inc., Oakland, Calif.

[21] Appl. No.: 776,634

[22] Filed: Mar. 11, 1977

[51] Int. Cl.² .......................... B23D 15/08; B26D 5/12
[52] U.S. Cl. .......................................... 83/624; 83/636; 83/639
[58] Field of Search ................. 83/624, 625, 626, 636, 83/639, 640, 641

[56] References Cited

U.S. PATENT DOCUMENTS

| | | | |
|---|---|---|---|
| 3,145,602 | 8/1964 | Pearson et al. | 83/624 X |
| 3,183,756 | 5/1965 | Dehn | 83/624 X |
| 3,242,786 | 3/1966 | Giordano | 83/640 X |
| 3,323,401 | 6/1967 | Pearson et al. | 83/640 X |
| 3,349,669 | 10/1967 | Richardson | 83/624 X |
| 3,568,558 | 3/1971 | Passa | 83/624 X |
| 3,885,485 | 5/1975 | Savory | 83/626 X |
| 3,911,775 | 10/1975 | Pearson | 83/626 |
| 4,027,567 | 6/1977 | Jones | 83/624 |

Primary Examiner—J. M. Meister

[57] ABSTRACT

A rake angle adjustment assembly operated from the front of a shear machine to adjust a fluid control valve which effects a rake angle adjustment; such assembly being intimate with the movable ram being adjusted in such a manner that the achieving of the correct rake angle stops the adjustment process.

3 Claims, 9 Drawing Figures

FRONT OPERATED RAKE ADJUSTMENT ASSEMBLY

The invention relates to a rake angle control adjustment for a shear machine that may be easily manipulated from the front of the machine by an operator.

Current devices available to change the rake angle of a ram generally are placed on the side of the machine making them unhandy or inconvenient to operate.

Among the objects of my invention are:
(1) To provide a novel and improved rake control adjustment assembly for a shear machine;
(2) To provide a novel and improved rake control adjustment assembly for a shear machine that is readily accessible to an operator;
(3) To provide a novel and improved rake control adjustment assembly for a shear machine that is a simple one hand operation;
(4) To provide a novel and improved rake control adjustment assembly for a shear machine that can be used on shears of various lengths;
(5) To provide a novel and improved rake control adjustment assembly consisting of simple mechanical parts;
(6) To provide a novel and improved rake control adjustment assembly for a shear machine that is relatively maintenance free.

Additional objects of my invention will be brought out in the following description of the same, taken in conjunstion with the accompanying drawings wherein.

Figure 1:
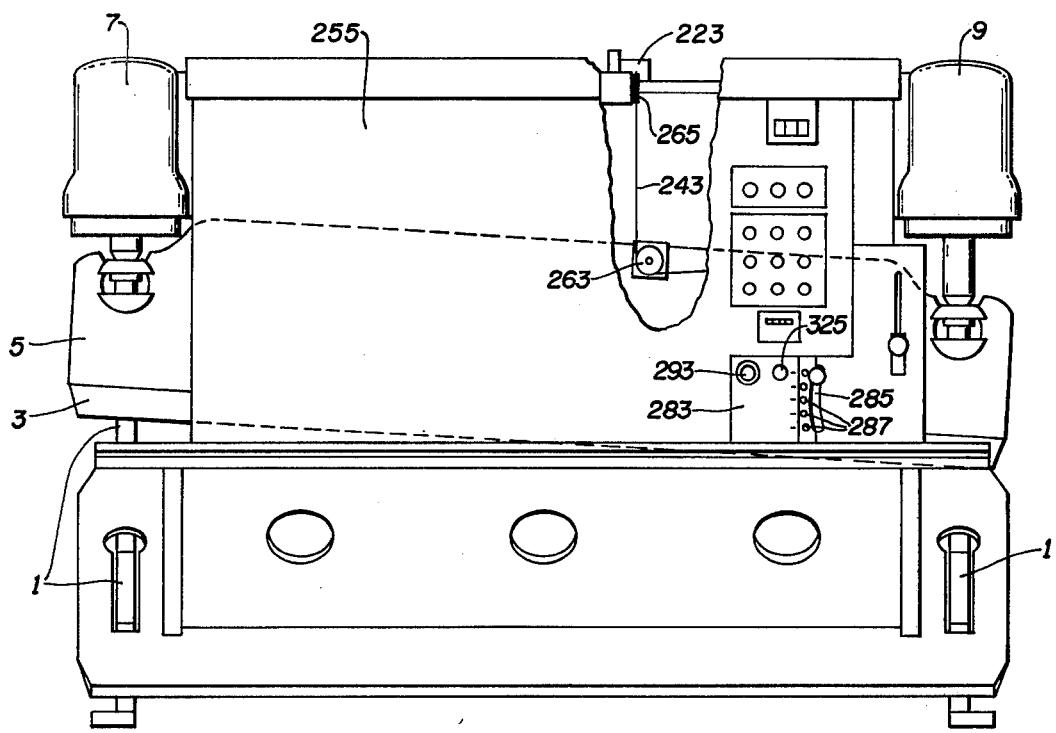
FIG. 1 is a front view in elevation of a shear machine with the invention installed.

Referring to the drawings for details of my invention, the same is illustrated as applied to a shear machine having side walls 1, and upper knife 3 supported on the lower portion of a movable ram 5, a pair of reciprocal drive piston assemblies 7, 9, each pivotally connected to different ends of the movable ram, and an adjustment means for varying the rake angle of the ram including a mechanical rake angle adjustment control means operated from a stationary frontally located control panel.

Shears of this type may have a back-gauge adjustment; and a hydraulic control circuit 11 for the same, though included in the drawing, is not necessary to an understanding of the current invention and therefor is not further described.

Hydraulic control of such ram movement is exercised preferably through synchronized control of different combinations of various valves utilized in associated hydraulic circuits. Such valves are of various types and structurally in common may include a housing 13 having an offset flow passageway 15. Such passageway involves at an intermediate point, a valve seat 17 against which a cylindrical shaped main valve 19 is normally seated by a biasing spring 21 housed in a recess 23 in the valve and bears against a head section 25 to create a chamber adjacent that end of the valve. A small opening 29 through the wall of the recess permits liquid communication with the inlet of the main passageway, whereby pressure may accumulate in the spring recess in the chamber above to assist the spring in maintaining closing pressure on the valve.

An auxiliary passageway 33 from the input end of the main flow passageway to the opposite end of the cylindrically shaped main valve, will bring input pressure to bear against this end of the valve in opposition to the pressure buildup in the spring recess 23 due to the combined liquid pressure and that of the main valve biasing spring 21. The normal differential pressure will be in the direction of seating the main valve. Any release of hydraulic pressure assisting the spring, will reverse the differential pressure on the main valve, which will then be in the direction of opening such valve.

Release of hydraulic pressure from the chamber is normally provided by a means adapted to open or close a hydraulic by-pass circuit 35 circumventing the valve 19 and returning to the line at the discharge or low pressure side of the valve. Such a by-pass circuit includes the recess 23 in the valve and its associated small opening 29, the created chamber, a passageway 41 in the head intercepting such chamber, and the opening or closing means 43 flow connected to an external opening 45 in the passageway which controls return to the hydraulic circuit on the discharge side of the valve housing.

The above described structure is basic to all of the valve types utilized in the disclosed embodiment of the invention and itself is characterized as a "dump" valve 47.

A pressure responsive valve assembly 51 installed within the head, in a second by-pass passageway 53, connecting the first passageway directly to the discharge side of the valve housing, and having a biasing spring 55 urging a conical valve 57 into a seat 59 between the first passageway and the second passageway, alters the basic structure to function as a "down" or "relief" type valve 61. Pressure at which the conical valve is unseated is dependent upon the pressure exerted by the biasing spring which is dependent upon the position within the passageway of a spring seat 65, the longitudinal position of which is adjustable through the intermediary of a threaded bolt 67, the end of which abuts the spring seat; such adjustability permitting the setting to a minimum pressure at which to allow the opening of the second passageway.

Under conditions whereby hydraulic input pressure is below that threshold for which the biasing spring is so adjusted, hydraulic flow through the valve is completely controlled by the opening and closing of the hydraulic bypass circuit 35 with little effect exerted by the pressure responsive valve. However, should input pressure rise when the bypass circuit is closed, pressures above the biasing threshold will be vented through the second passageway, thus enabling the maintenance of a predetermined pressure level at the input side of the valve assembly and providing protection against pressure surges and high pressure conditions which could cause damage to equipment.

A similar type pressure responsive valve assembly 68 when installed within the head passageway 41 of the basic valve assembly for adjustably interrupting such passageway, depicts the structure of a "foot" type valve 69. The pressure needed to unseat the conical valve in this configuration, and subsequently allow the main valve to open, must always be greater than the compression pressure of the biasing spring when the hydraulic bypass is open to flow. This arrangement provides a constant pressure level on the input side of the valve assembly when the hydraulic bypass circuit is open and complete shutoff at all pressures when the hydraulic bypass circuit is closed. Such are the characteristics of a "foot" valve.

A "two-up" valve 70 may be characterized as the basic valve assembly with a bottom extension 71 affixed thereto, including an extension 73 of the auxiliary passageway 33 terminating on the discharge side of the offset main flow passageway.

A pressure responsive valve assembly 75, similar to that used in the "relief" type valve, installed in blocking relationship to flow through such extention of the auxiliary passageway 73, provides for opening the cylindrical valve to flow in the reverse direction when the pressure on the discharge side of the assembly overcomes that of the input side, only if the pressure is above that adjusted for with the conical valve biasing spring, thus providing a differential pressure within the assembly in the direction of unseating the main valve.

The hydraulic bypass circuit opening and closing means 43 includes an electrically controlled solenoid operated pilot valve in interrupting relationship with the hydraulic bypass circuit.

Figure 4:
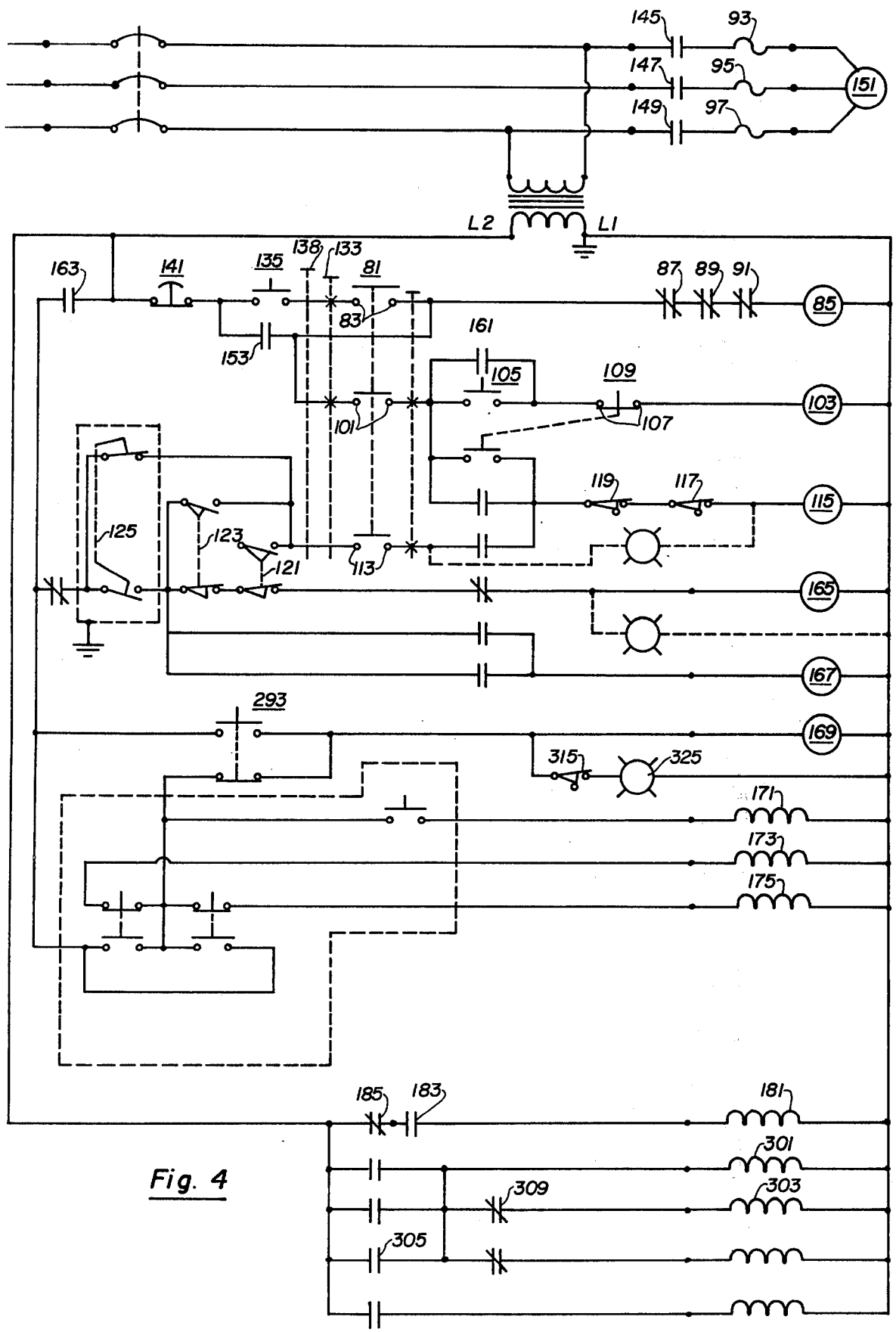
FIG. 4 is an electrical control circuit for the shear machine involving the invention.

Sequence control of the valves used to achieve the various functions of the shear machine, may be illustrated by the electrical circuit used to control the pilot valve solenoids as shown in FIG. 4 wherein, control is first initiated through a cycle-up procedure invloving a three position key operated switch 81 containing three sets of contacts.

A first set of contacts 83 is in circuit with a motor starter 85 and normally closed motor overload contacts 87, 89, 91 associated respectively with the circuit breakers 93, 95, 97 in the three line phases. A second set of contacts 101 in the switch are in circuit with a power relay 103, a reset pushbutton 105 and the normally closed contacts 107 of an "Emergency Return" pushbutton 109. A third set of switch contacts 113 is involved in circuit with a drive-up relay 115, limit switches 117, 119, 121, 123 and a switch 125 of the foot operated type used for initiation of shearing cycle.

Cycle-up is accomplished first by turning the three position key operated switch 81 from an off position 131, where no contacts are closed, to a first position 133, where the first and second sets of contacts 83, 101 are closed.

Depressing a "start" push-button 135 with the switch in the first position, completes a circuit from ground line L1 of a power source, through the motor starter 85 and overload contacts 87, 89, 91, the first set of contacts 83 of the switch, the normally closed contacts of an emergency stop push-button 141 to power line L2 of the power source, thus activating the motor starter. The starter closes contacts 145, 147, 149 across a decreasing resistance in each of the three alternating current phases, bringing the motor 151 up to full speed.

Holding contacts 153 on the motor starter close when the starter is activated and complete a holding circuit around the start push-button 135 and the switch assembly 81.

Motor starter holding contacts 153 also complete a circuit through power relay 103 upon depression of the reset push-button 105. This circuit is from the ground line L1, through the power relay 103, the normally closed contacts of the emergency return pushbutton 109, the reset push-button, contacts 101 of the switch assembly, holding contacts of the motor starter 153, the emergency stop pushbutton, and to power line L2.

Activating the power relay, closes holding contacts 161 providing a holding circuit around the reset pushbutton 105 when it is released. The shear at this stage is in a cycled-up idle condition.

The power relay 103 has normally open contacts 163 in series with the common power line path L2 of the drive-up relay 115, a drive-down relay 165, a single stroke relay 167, and a rake and back-gauge adjustment relay 169, preventing activation of these relays unless the motor is running and the power relay has been activated.

The drive-up relay 115, drive-down relay 165, and single stroke relay 167 are not part of the present invention, nor are the foot switch 125, back-gauge control solenoids 171, 173, 175, and limit switches 117, 119, 121, 123, all of which are concerned with controlling of the shearing cycle of the machine and back-gauge adjustment, and since description of their operation is not necessary for an understanding of the invention, further description is not deemed necessary at this time.

With the shear machine at idle, the power relay alone is activated. The dump valve pilot solenoid 181 is the only one actuated through a circuit from ground L1, the dump valve pilot solenoid, a set of now closed contacts 183 of the power relay, a set of normally closed contacts 185 of the drive-up relay and to the power source L2.

Activating the normally open dump valve 47, closes the hydraulic by-pass circuit and prevents any fluid flow through the valve from the top of the right piston 9 as would normally be the case when the ram is returning to its "up" position. This dump valve will remain activated, and thereby closed, throughout any rake adjustment operations.

Hydraulic fluid flow at cycled-up idle, is via a hydraulic circuit from a tank or resevoir 191 through a pump 193, through the normally open relief valve 61A and back to the tank or reservoir through a filter 195.

Vertical movement of the ram may be attained by both drive pistons acting simultaneoudly in the same direction. This is accomplished by supplying hydraulic energy from the reservoir 191 (FIG. 5) by a motor driven pump 192, 193 through a main flow line by way of a "down" valve 61B to the upper end of the right piston assembly, which in turn is hydraulically connected in series with the left piston assembly by a connecting line 205 from a point below the piston of the right assembly to a point above the piston of the left assembly.

The circuit is completed by a return line 207 from the lower end of the cylinder of the left assembly, through a "foot" valve 69 and back to the reservoir from which the pump drives its liquid.

The piston assemblies are thus operated in series and to insure equal rate of travel of both pistons, all other factors being favorable, the right piston assembly is so designed that the under surface of its piston is equal in area to the upper surface of the piston in the left piston assembly.

For normal upward return movement of the ram, the output of the pump is caused to flow in a reverse direction to the cylinder assemblies, the flow of liquid being brought through the "two-up" valve 70 to the underside of the smaller piston of the left drive piston assembly and from the upper end of the smaller piston to the underside of the right piston and from the upper portion of the right piston assembly through the operating "dump" valve 47, and back to the resevoir.

For shearing operations, it becomes necessary to set the angle of the ram at some slope dependent upon the nature of the work to be sheared. The angle of this slope is referred to as the rake angle, and as can be seen, may be changed by supplying power to the cylinders unevenly.

To this end, a valve 221 preferably of the servo type, is connected by hydraulic means to the piston assemblies through an appropriate hydraulic system. A valve, and associated hydraulic control system, of the type suitable for use in the rake angle control of the present invention, is disclosed in a patent issued to E. W. Pearson et al., for "CONTROL MEANS FOR SERIES CONNECTED DRIVE ASSEMBLIES" issued as U.S. Pat. No. 3,143,924 dated Aug. 11, 1964.

Figure 3:
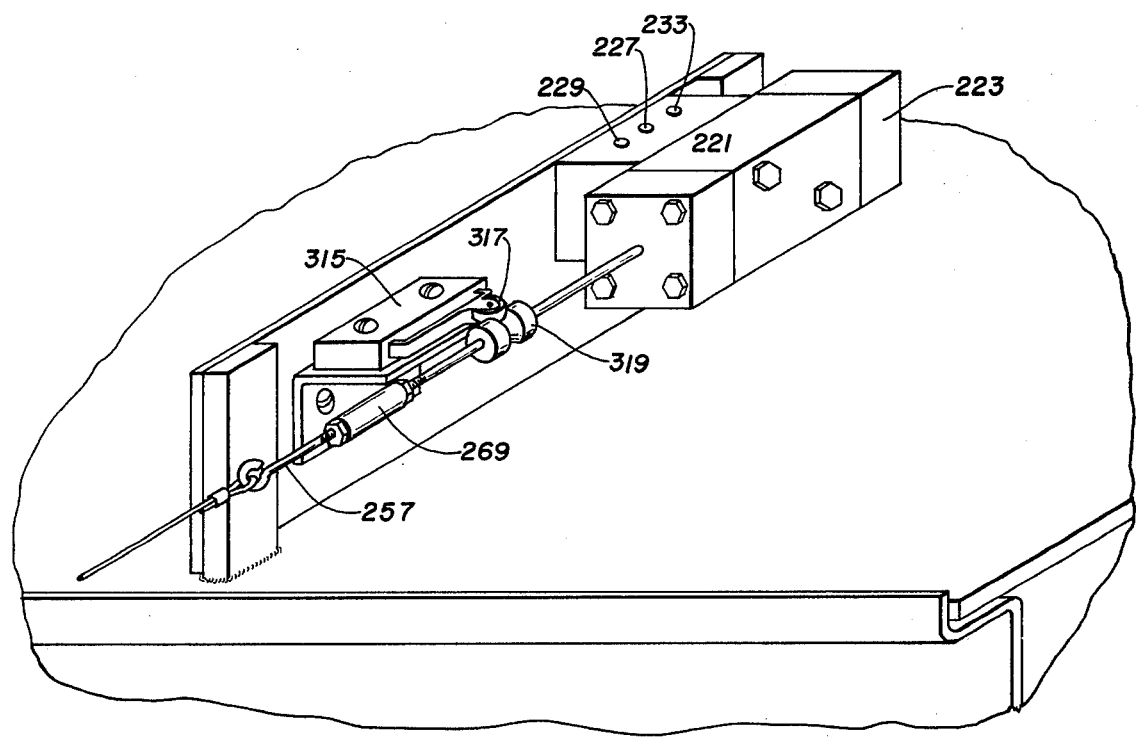
FIG. 3 is an isometric view depicting a spool valve and a switch indicator feature of the invention.
Figure 2:
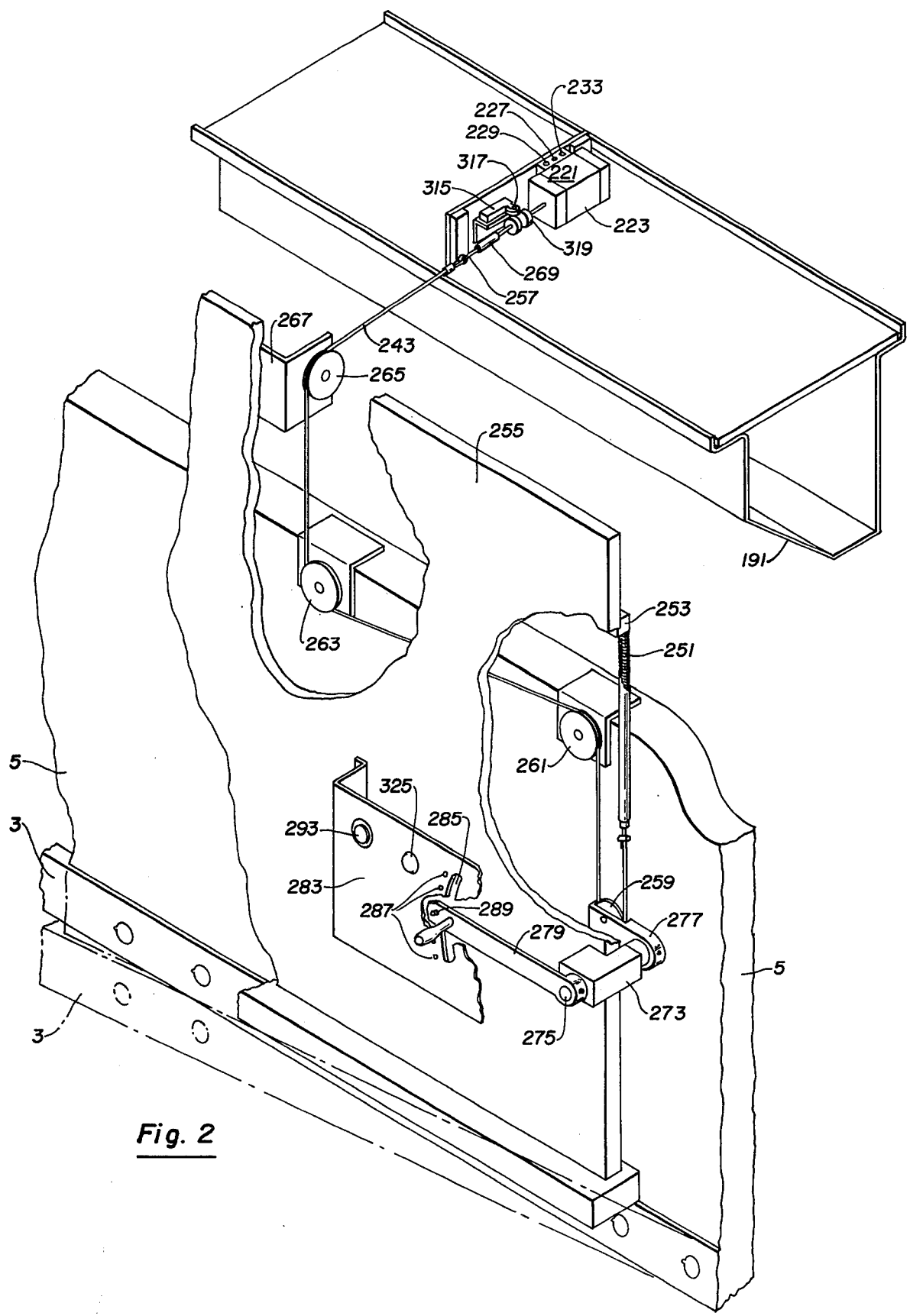
FIG. 2 is a fragmentary three dimensional view depicting that part of the machine involving the invention.
Figure 5:
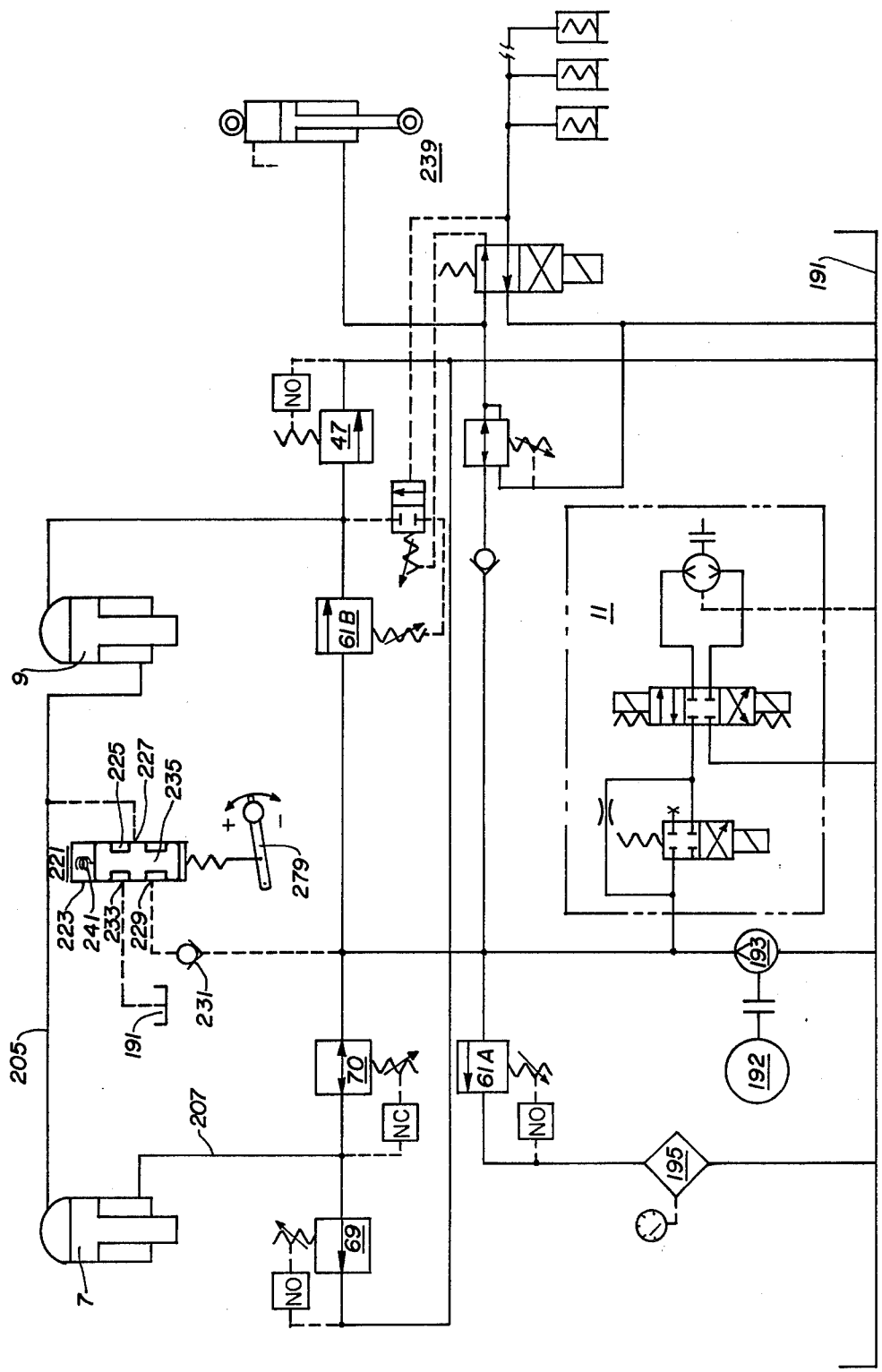
FIG. 5 is a hydraulic control circuit for the shear machine involving the invention.
Figure 9:
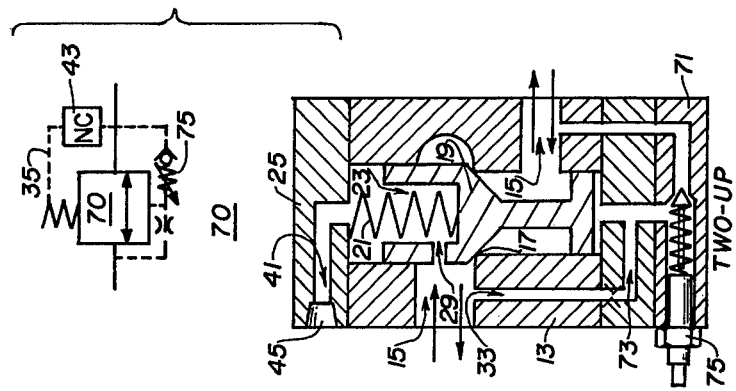
FIG. 9 is a view in section of a Two-Up valve used in the hydraulic circuit of FIG. 5.
Figure 8:
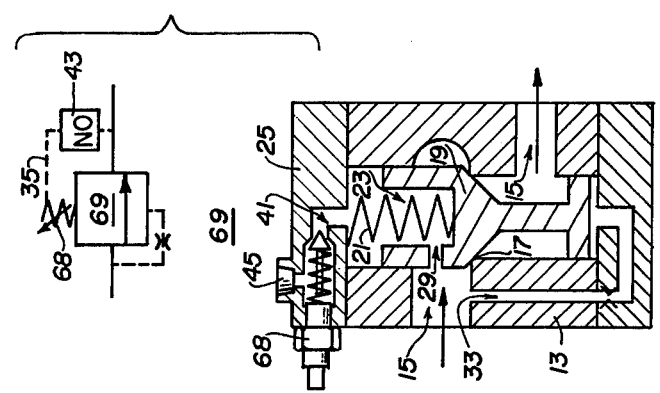
FIG. 8 is a view in section of a Foot valve used in the Hydraulic circuit of FIG. 5.
Figure 7:
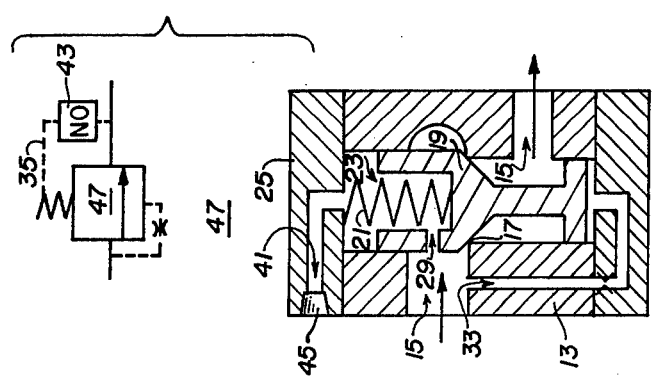
FIG. 7 is a view in section of a Dump valve used in the Hydraulic circuit of FIG. 5.
Figure 6:
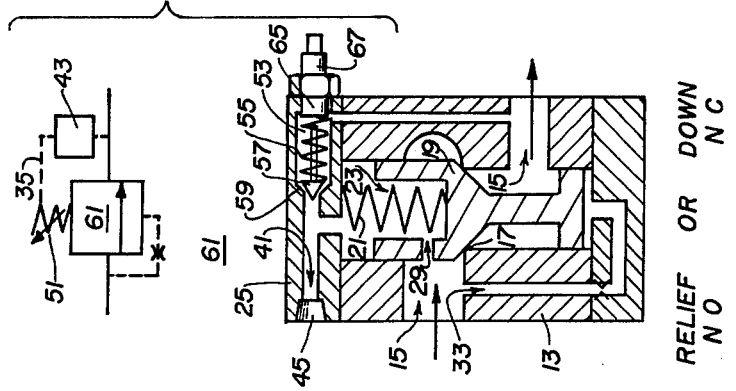
FIG. 6 is a view in section of a Relief or Down valve used in the hydraulic circuit of FIG. 5.

A servo valve of this type is shown in FIG. 2 and FIG. 3 and diagrammatically exposed in FIG. 5. The valve comprises a housing 223 mounted on a fixed portion of the machine and involves an internal chamber 225 with three external ports. One port 227 of the housing is hydraulically connected between the two piston assemblies, while of the other two ports, one 229 is hydraulically connected to the pump 193 through a valve 231 of the "check" type while the other 233 is hydraulically connected to the fluid reservoir.

A spool 235 enclosed within the internal chamber, exposes the port connected between the two pistons to either the pump or the reservoir, depending upon the direction of movement of the spool from a centered or null position within the housing.

As can be seen, introducing fluid into the series connection between the two piston assemblies and concurrently closing the "down" 61B and "dump" 47 valves, locks the right piston assembly from movement, and results in downward movement of the left piston and rotation of the ram about the right side pivotal connection with a resulant change in rake angle toward the horizontal.

"Down" valve 61B is under control of a hydraulic hold-down system 239 which is being made the subject of an application being filed concurrently herewith.

Conversely, with the right piston still immobile, introducing fluid below the left piston and exposing the line between the two pistons to the reservoir, the left piston and consequently the left side of the ram will be moved upward, increasing the slope of the rake angle.

A distended spring 241 is employed at one end of the valve spool to apply a biasing force to such spool, and a control cable 243 and cable tensioning and relaxing means attached to the other end of the spool, such that with the cable adjusted in one direction a tension force will be applied to the spool, and when adjusted in the opposite direction the biasing spring will be permitted to shift the spool in the opposite direction.

The first case, the in-open position, is characteristic of the condition needed for lowering of the rake angle. Hydraulic flow in this confirguation is from the reservoir through the pump, through the check valve into the flow line between the two piston assemblies by way of the spool valve, to the top side of the left piston assembly. The flow circuit is then completed from the underside of the left piston assembly through the "foot" valve and back to the reservoir.

In the second case, the out-open position, characteristic of increasing the slope or rake angle, flow is from the reservoir through the pump, through the "two-up" valve 70 to the lower side of the left piston assembly at a pressure determined by the adjustment of the "foot" valve 69. Completion of the circuit in this configuration is from the upper portion of the left cylinder assembly through the spool valve and back to the reservoir.

The control cable 243 is attached to a preloaded spring 251 suspended from a connecting point 253 on the upper portion of a plate 255 used as a shield in front of the ram and connected to the spool valve stem 257 of the servo valve assembly by way of a tensioning pulley 259, two transverse pulleys, a first 261 and a second 263 affixed to the upper front surface of the ram to guide the cable transversely across the ram, and an upper fixed pulley 265 mounted on a bracket 267 attached to the ram shield plate 255 near its upper part and in alignment between the second transverse pulley and a turnbuckle 269 for adjusting the valve to its null position.

A cable path between the tensioning pulley 259 and the first transverse pulley 261 being substantially parallel to the path between the second transverse pulley 263 and the upper fixed pulley 265, allow vertical up and down ram movement with no significant effect on cable tensioning as seen at the point of connection with the spool valve stem; consequently, the equilibrium achieved by having the spool in a null position within the valve, is maintained and will remain so as long as the length of cable between the upper fixed pulley and the cable tensioning spring connection remains constant.

A pivot axis mounting assembly 273 straddles the edge of the ram shield plate 255 in proximate alignment with the cable tensioning spring 251, and includes a rotatable shaft therethrough 275, one end of such shaft being secured to a tensioning arm 277 which includes the tensioning pulley, the other end fixed to the pivot end of a rake adjustment level 279 accessible at the front side of the ram shield plate. Rotation of this lever from the front of the ram causes a corresponding rotation of the tensioning pulley, resulting in either a tensioning or relaxing of the cable with a consequent disturbance of the aforementioned equilibrium.

A rake angle control panel 283 preferably affixed to and spaced from the ram shield plate, includes an arcuate slot 285 lined with a plurality of rake angle locking holes 287 with which to receive a locking pin 289 from the free end of the adjustment lever, such lever preferably being made from a slender piece of steel with a spring action necessary to maintain the locking pin in a locking hole.

After setting the rake angle adjustment arm and locking it to the desired position, a rake change push button 293 may be used to position the ram to the selected angle. With the button depressed and maintained, the rake adjustment relay 169 is activated through a circuit from ground L1, through the relay coil, normally open contacts of the rake change push button, and the now closed contacts of the power relay 163 to the power source L2. Activating this relay provides a circuit for activating the relief valve pilot 301 and two-up pilot solenoid 303, the relief pilot from the ground source L1, the pilot valve solenoid 303, the now closed contacts of the rake adjustment relay 305, and the power source L2;